(12) United States Patent
Xu et al.

(10) Patent No.: US 11,989,423 B2
(45) Date of Patent: May 21, 2024

(54) TECHNIQUES FOR ZONED NAMESPACE (ZNS) STORAGE USING MULTIPLE ZONES

(71) Applicant: Lemon Inc., Grand Cayman (KY)

(72) Inventors: Peng Xu, Los Angeles, CA (US); Sheng Qiu, Los Angeles, CA (US); Chaohong Hu, Los Angeles, CA (US); Kyoungryun Bae, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 66 days.

(21) Appl. No.: 18/056,083

(22) Filed: Nov. 16, 2022

(65) Prior Publication Data

US 2023/0075437 A1    Mar. 9, 2023

(51) Int. Cl.
*G06F 3/06* (2006.01)
*G06F 12/0802* (2016.01)

(52) U.S. Cl.
CPC ............ *G06F 3/0619* (2013.01); *G06F 3/064* (2013.01); *G06F 3/0679* (2013.01); *G06F 12/0802* (2013.01)

(58) Field of Classification Search
CPC ...... G06F 3/0619; G06F 3/064; G06F 3/0679; G06F 3/0644; G06F 12/0802; G06F 12/0246; G06F 12/0866; G06F 2212/214; G06F 2212/262; G06F 2212/312; G06F 2212/7201; G06F 2212/7208
See application file for complete search history.

(56) References Cited

U.S. PATENT DOCUMENTS

| 11,853,285 B1* | 12/2023 | Ekins ................. G06F 11/1469 |
| 2023/0393905 A1* | 12/2023 | Darji ..................... G06F 3/0604 |
| 2023/0409536 A1* | 12/2023 | Singh ..................... G06F 3/067 |

* cited by examiner

*Primary Examiner* — Hiep T Nguyen
(74) *Attorney, Agent, or Firm* — Astute IP Law Group (57) ABSTRACT

Described are examples for storing, in a first zone cache, one or more logical blocks (LBs) corresponding to a data chunk, writing, for each LB in the data chunk, a cache element of a cache entry that points to the LB in the first zone cache, where the cache entry includes multiple cache elements corresponding to the multiple LBs of the data chunk, writing, for the cache entry, a table entry in a mapping table that points to the cache entry, and when a storage policy is triggered for the cache entry, writing the multiple LBs, pointed to by each cache element of the cache entry, as contiguous LBs in an isolation block for the data chunk in a second zone stream, and updating the table entry to point to the isolation block in the second zone stream.

20 Claims, 8 Drawing Sheets

TECHNIQUES FOR ZONED NAMESPACE (ZNS) STORAGE USING MULTIPLE ZONES

BACKGROUND

The described aspects relate to storage devices, such as zoned namespace (ZNS) storage devices, and more particularly, to zoned storage on ZNS storage devices.

In nonvolatile memory express (NVMe) storage protocol, ZNS interface is defined and includes a command set for storage by dividing an NVMe namespace into zones, which are required to be sequentially written. ZNS offers essential benefits to hyper-scale organizations, all-flash array vendors, and large storage-system vendors, to take advantage of storage devices optimized for sequential write workloads. ZNS reduces device-side write amplification (WA), over-provisioning, and dynamic random access memory (DRAM) requirements, while improving tail latency, throughput, and drive capacity. By bringing a zoned-block interface to NVMe solid state drives (SSDs), ZNS brings alignment with the zoned-advanced technology attachment (ATA) command (ZAC)/zoned block command (ZBC) host model already being used by shingled magnetic recording (SMR) hard disk drives (HDDs) and enables a zoned-block storage layer to emerge across the SSD/HDD ecosystem.

In cloud storage, for example, a server can store data in data chunks that are greater in size than, and/or comprise multiple, logical blocks (LBs). The server traffic pattern for storing data chunks can be append-only multi-stream write, which works well with ZNS SSD. Currently in the SSD industry, the main stream vendor provides triple layer cell (TLC) NOT-AND (NAND) based large zone ZNS solution, which organizes physical blocks across all NAND die as a super block stripe as a zone and provide redundant array of independent disks (RAID) protection at zone basis. This solution, however, provides only a limited open zone due to cache and power loss protection resource (for example capacitor) limitation. With limited open zone, host cannot implement data separation based on the data hotness (e.g., the rate at which the data changes or is expected to change). In addition, in this solution, the zone is the append-only write/delete granularity, and the data chunk is server's append-only write/delete granularity. Thus, if zone size is larger than chunk size, garbage collection may be needed to reclaim free space in a finished zone which result in WA— e.g., larger zone size can lead to higher WA.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In an example, a method for zoned namespace (ZNS) storage using multiple zones is provided that includes storing, in a first zone cache, one or more logical blocks corresponding to a data chunk, writing, for each logical block in the data chunk, a cache element of a cache entry that points to the logical block in the first zone cache, where the cache entry includes multiple cache elements corresponding to the multiple logical blocks of the data chunk, writing, for the cache entry, a table entry in a mapping table that points to the cache entry, and when a storage policy is triggered for the cache entry, writing the multiple logical blocks, pointed to by each cache element of the cache entry, as contiguous logical blocks in an isolation block for the data chunk in a second zone stream, and updating the table entry to point to the isolation block in the second zone stream.

In another example, an apparatus for zoned namespace (ZNS) storage using multiple zones is provided where the apparatus includes a processor and a non-transitory memory with instructions thereon. The instructions upon execution by the processor, cause the processor to store, in a first zone cache, one or more logical blocks corresponding to a data chunk, write, for each logical block in the data chunk, a cache element of a cache entry that points to the logical block in the first zone cache, where the cache entry includes multiple cache elements corresponding to the multiple logical blocks of the data chunk, write, for the cache entry, a table entry in a mapping table that points to the cache entry, and when a storage policy is triggered for the cache entry, write the multiple logical blocks, pointed to by each cache element of the cache entry, as contiguous logical blocks in an isolation block for the data chunk in a second zone stream, and update the table entry to point to the isolation block in the second zone stream.

In another example, a non-transitory computer-readable storage medium storing instructions that when executed by a processor cause the processor to execute a method is provided. The method includes storing, in a first zone cache, one or more logical blocks corresponding to a data chunk, writing, for each logical block in the data chunk, a cache element of a cache entry that points to the logical block in the first zone cache, where the cache entry includes multiple cache elements corresponding to the multiple logical blocks of the data chunk, writing, for the cache entry, a table entry in a mapping table that points to the cache entry, and when a storage policy is triggered for the cache entry, writing the multiple logical blocks, pointed to by each cache element of the cache entry, as contiguous logical blocks in an isolation block for the data chunk in a second zone stream, and updating the table entry to point to the isolation block in the second zone stream.

To the accomplishment of the foregoing and related ends, the one or more implementations comprise the features hereinafter fully described and particularly pointed out in the claims. The following description and the annexed drawings set forth in detail certain illustrative features of the one or more implementations. These features are indicative, however, of but a few of the various ways in which the principles of various implementations may be employed, and this description is intended to include all such implementations and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to providing zoned namespace (ZNS) storage using small and large zone constructs. In current ZNS solid state drive (SSD), quad level cell (QLC) NOT-AND (NAND) is not supported, and QLC NAND open block may not be stable if left open for certain amount of time. A cloud-based server storing data chunks in ZNS storage, which can be referred to as a "chunkserver," cannot guarantee that it has fully written the whole NAND block. Forcing padding in a QLC block to fill the NAND block, in this example, can introduce in extra write amplification (WA), which may not be desirable. As such, some small zone solutions are proposed. By using small zone, in some examples, the throughput of an open zone may be low, and host software (e.g., application or chunkserver) may group small zones together to provide higher write throughput, which may require additional processing resources. Also, host software may use extra info (e.g., physical layout in NAND array for the zone) to do the grouping. In addition, for example, when zone is small, a device may not have stripe concept (e.g., rows of data written to the zone or multiple zones), so it may not provide cannot provide stripe-based redundant array of independent disks (RAID) protection. In this case, for cloud storage, service level agreement (SLA) may reduce, data recovery may fully depend on cloud level energy consumption (EC) so that the explosion radius is higher. In addition, QLC may not be supported for small zones due to open block retention problem just like large zone solution.

In accordance with aspects described herein, multiple the ZNS storage can use multiple zones for efficiently storing data as received, and moving the data to sequentially stored blocks to facilitate data chunk based operations. For example, data blocks that form a data chunk can be initially stored in a first zone cache that uses append-only write to facilitate rapid storage of the data blocks. When all data blocks of the data chunk are in the first zone cache (or based on a different storage policy trigger), the data blocks of the data chunk can be sequentially written to an isolation block in a second zone stream for storage. Storing the data blocks of the data chunk together in an isolation block can facilitate data chunk-based operations, such as reading the entire data chunk, deleting the data chunk, etc., which can be more efficient for cloud-based applications that operate using the data chunks. In addition, the data in the first zone cache can be processed if needed before storage in the small zone stream. Moreover, redundancy protection (e.g., RAID protection) can be separately provided for each of the multiple zones (e.g., separately for the first zone cache and the second zone stream. In one example, the first zone cache can be of a larger size than the isolation blocks in the second zone stream. As such, the first zone cache can be referred to herein as a large zone cache, and the second zone stream can be referred to herein as a small zone stream.

Figure 4:
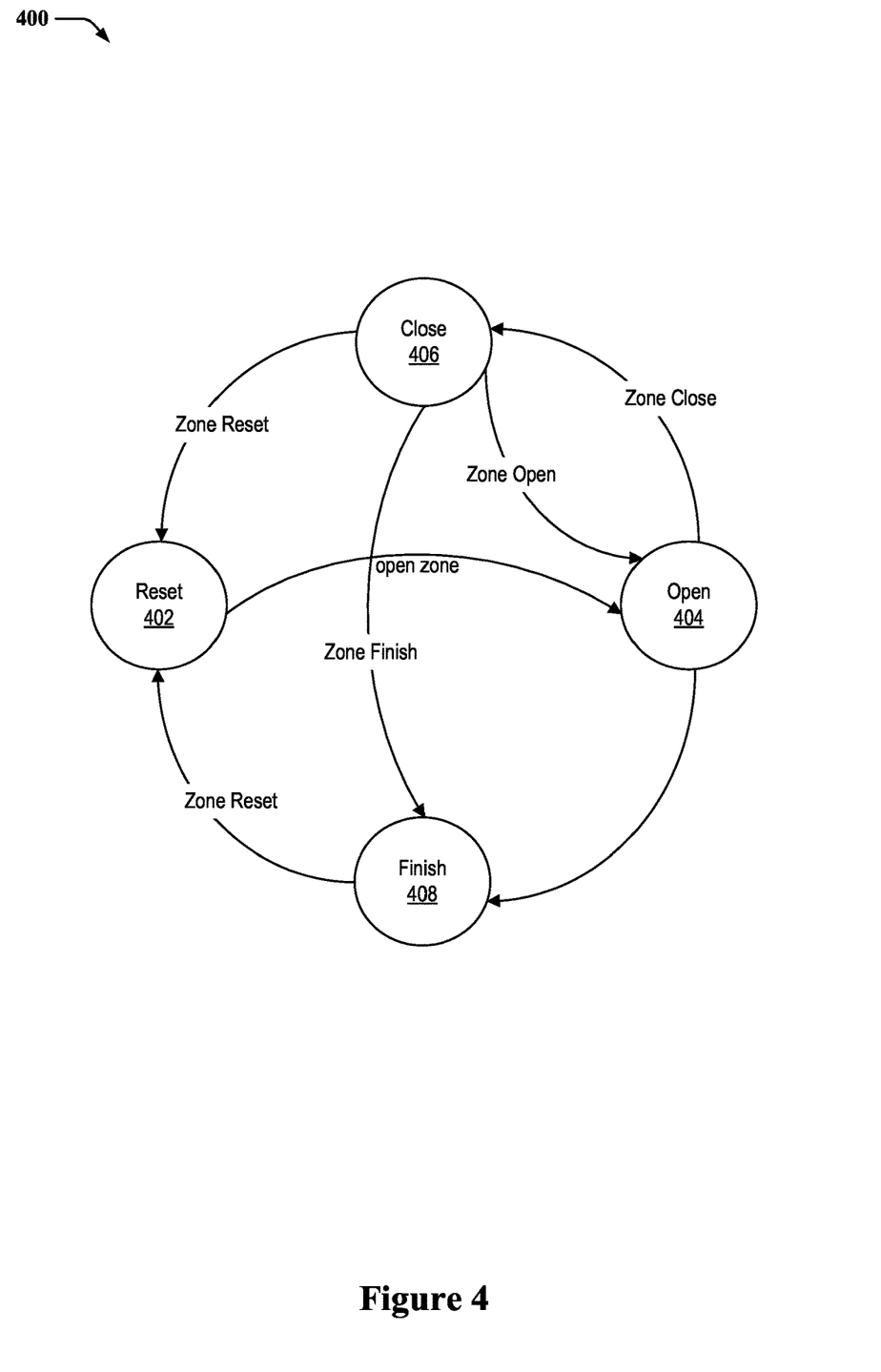
FIG. 4 illustrates an example of a state machine for a mapping table entry in accordance with aspects described herein
Figure 5:
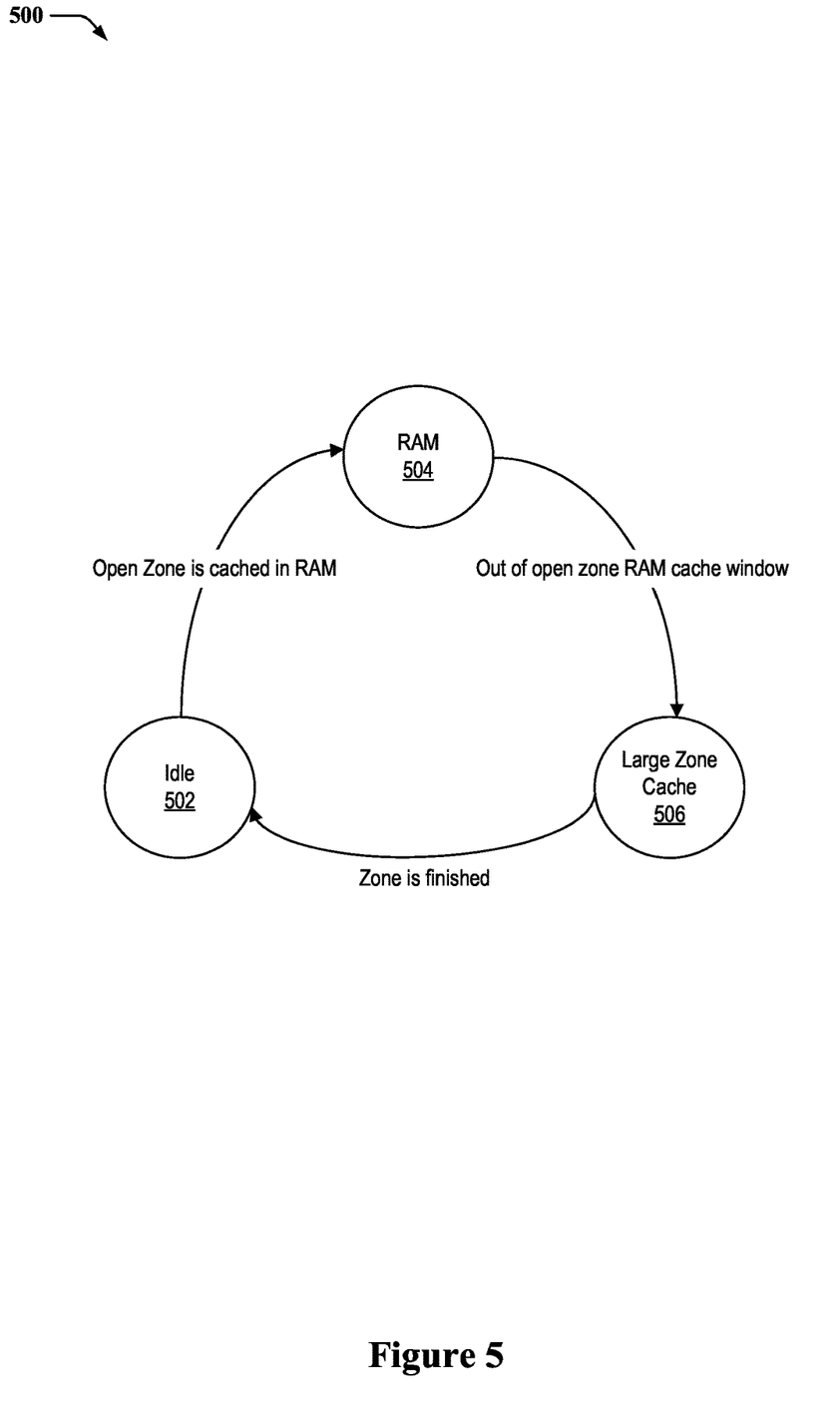
FIG. 5 illustrates an example of a state machine for a mapping cache cache entry in accordance with aspects described herein
Figure 6:
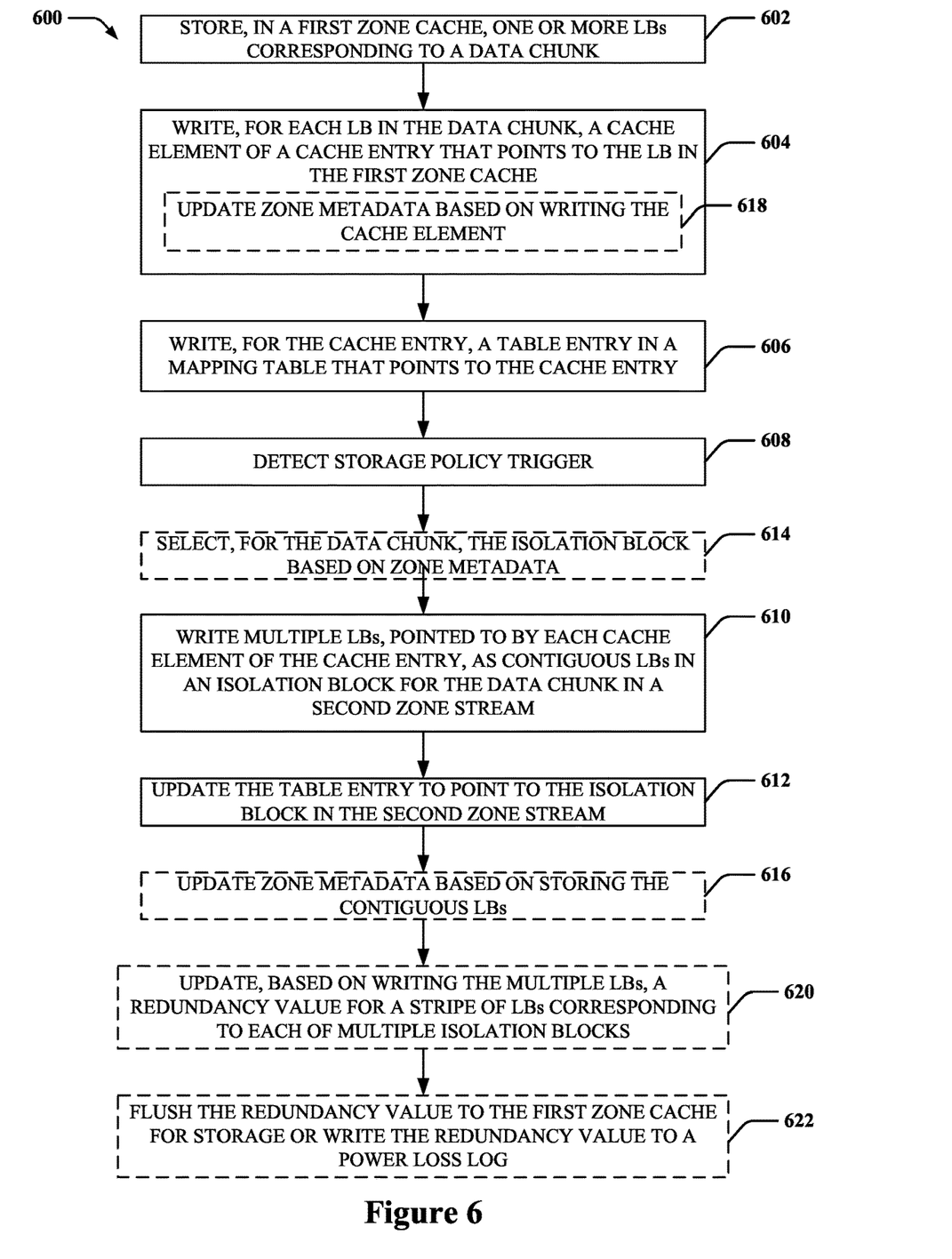
FIG. 6 is a flow diagram of an example of a method for writing data chunks in zone storage in accordance with examples described herein.
Figure 7:
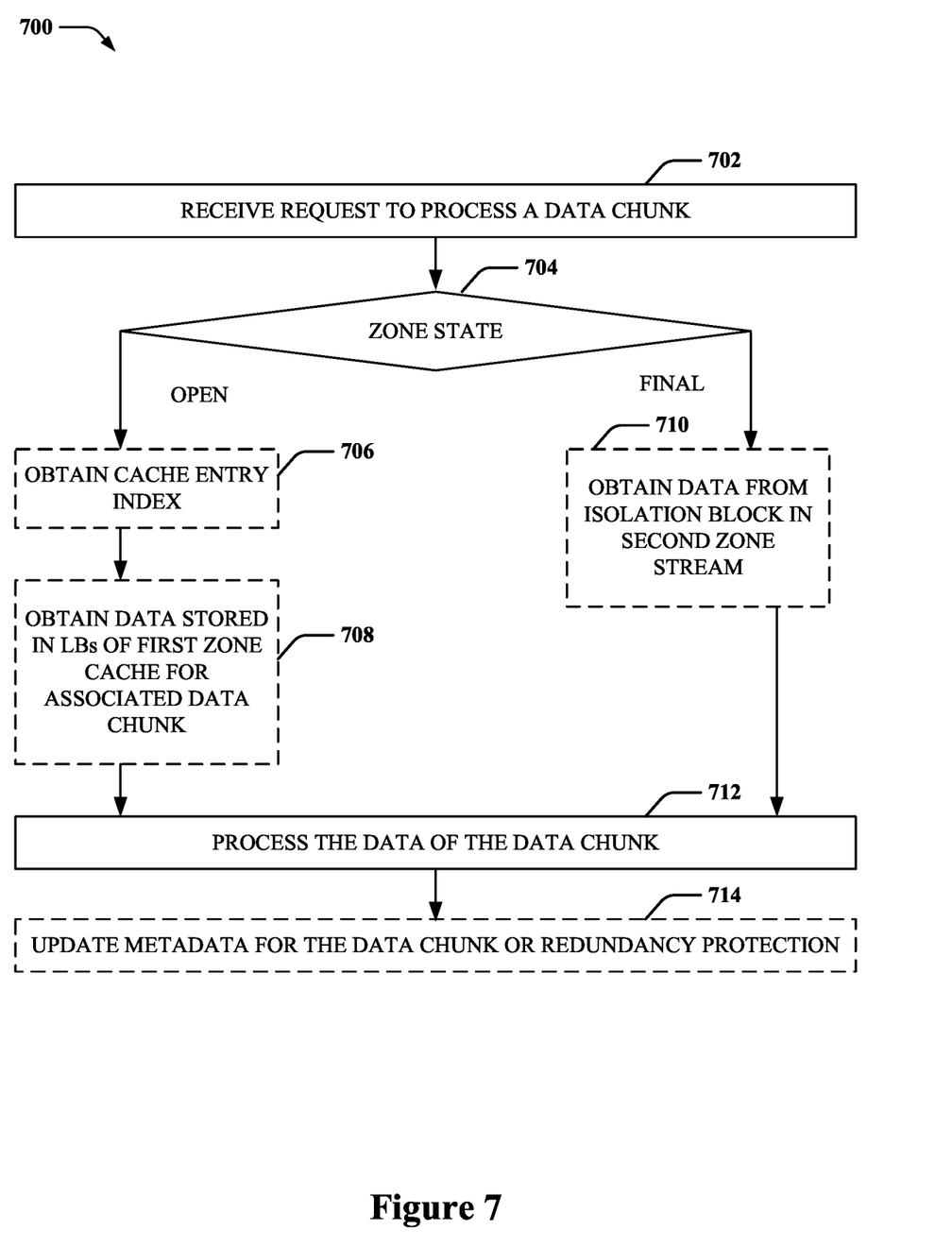
FIG. 7 is a flow diagram of an example of a method for processing data chunks stored in a zone storage in accordance with examples described herein.

Turning now to FIGS. 1-8, examples are depicted with reference to one or more components and one or more methods that may perform the actions or operations described herein, where components and/or actions/operations in dashed line may be optional. Although the operations described below in FIGS. 6 and 7 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
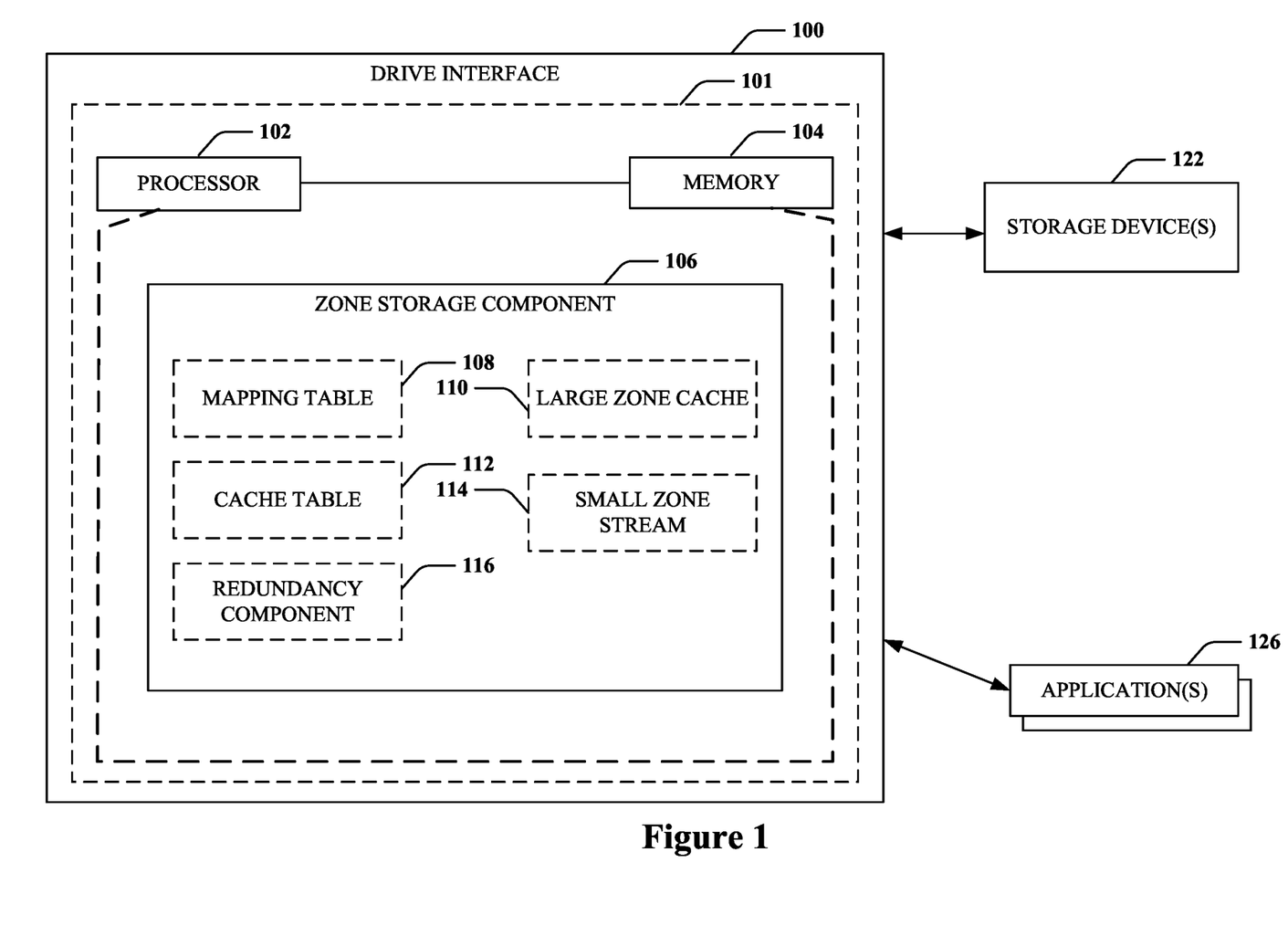
FIG. 1 is a schematic diagram of an example of a drive interface for facilitating access to one or more storage devices in accordance with examples described herein.

FIG. 1 is a schematic diagram of an example of a drive interface 100 for facilitating access to one or more storage devices 122. For example, the storage devices 122 can include one SSD, multiple SSDs, which can be combined into a single system storage, etc. Where multiple storage devices 122 are present, for example, the drive interface 100 can facilitate mapping the multiple storage devices 122 as a single system storage by including logic or algorithms to resolve a physical LB address (LBAs) to a physical LB on one of the multiple storage devices 122. In one example, a physical LBA 0 can correspond to LB 0 on a first storage device, physical LBA 1 can correspond to LB 0 on a next storage device, etc., such that a physical LBA can be resolved to a storage device based on the physical LBA divided by the number of storage devices 122, and the physical LB on the storage device that is based on the physical LBA modulo the number of storage devices 122. This is just one specific example of combining storage devices 122 into a single system storage, and substantially any mechanism to combine the multiple storage devices is possible such that the drive interface 100 can allocate physical LBAs and know how to resolve the physical LBA to the physical LB of a certain storage device.

In an example, drive interface 100 can provide one or more applications 126 with access to the storage device(s) for storing data, retrieving stored data, updating stored data, etc. In one example, drive interface 100 can provide cloud-based storage for one or more applications 126 that may execute in the cloud (e.g., on one or more servers that are remotely connected via one or more networks). For example, drive interface 100 may be accessible by the one or more servers via the cloud, and can be used to store data for the one or more servers, one or more applications 126 executing thereon, etc.

For example, drive interface 100 can include a processor 102 and/or memory 104 configured to execute or store instructions or other parameters related to providing a zone storage component 106. The processor 102 and/or memory 104 can be part of firmware on the drive interface 100. In one example, drive interface 100 can leverage processor 102 and/or memory 104 of a computing device that includes the drive interface 100 to execute the drive interface 100, associated firmware, associated functions and/or components described herein, etc. In one example, the drive interface 100 can be coupled to an interface bus on a server, and can utilize the processor 102 and/or memory 104 of the server (e.g., alone or in conjunction with additional processing or memory resources of the drive interface 100) to provide the functions and/or associated components described herein. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component 101), and/or the like. Memory 104 may store instructions, parameters, data structures, etc., for use/execution by processor 102 to perform functions described herein.

In an example, drive interface 100 can provide cloud-based storage for the one or more application 126, which may include storing data chunks received from the one or more applications 126. A data chunk may be fixed in size and may be larger than a logical block of the storage device(s) 122, such to include multiple logical blocks of the storage device(s) 122. For example, a data chunk can be 64 megabytes (MB) in size, and a logical block, or NAND block, can be 128 kilobytes (KB), 256 KB, 512 KB, etc.

In an example, zone storage component 106 can facilitate storing data on the storage device(s) 122 by using multiple zones—a large zone to receive the data in append-only write mode, and a small zone to store the data in isolation blocks each corresponding to a data chunk. For example, zone storage component 106 can include a mapping table 108 for mapping zones to isolation blocks, where a zone and isolation block can refer to a data chunk, a large zone cache 110 for storing logical blocks (e.g., NAND blocks) of data received from the one or more application(s) 126 in append-only write mode, a mapping cache 112 for mapping logical block addresses (LBAs), (e.g., NAND physical addresses (NPAs)) of the logical blocks to a zone, a small zone stream 114 for storing isolation blocks of the logical blocks corresponding to a zone, and/or a redundancy component 116 for managing redundancy protection (e.g., RAID protection) for the data stored in the large zone cache 110 and/or in the isolation blocks in the small zone stream 114.

Figure 2:
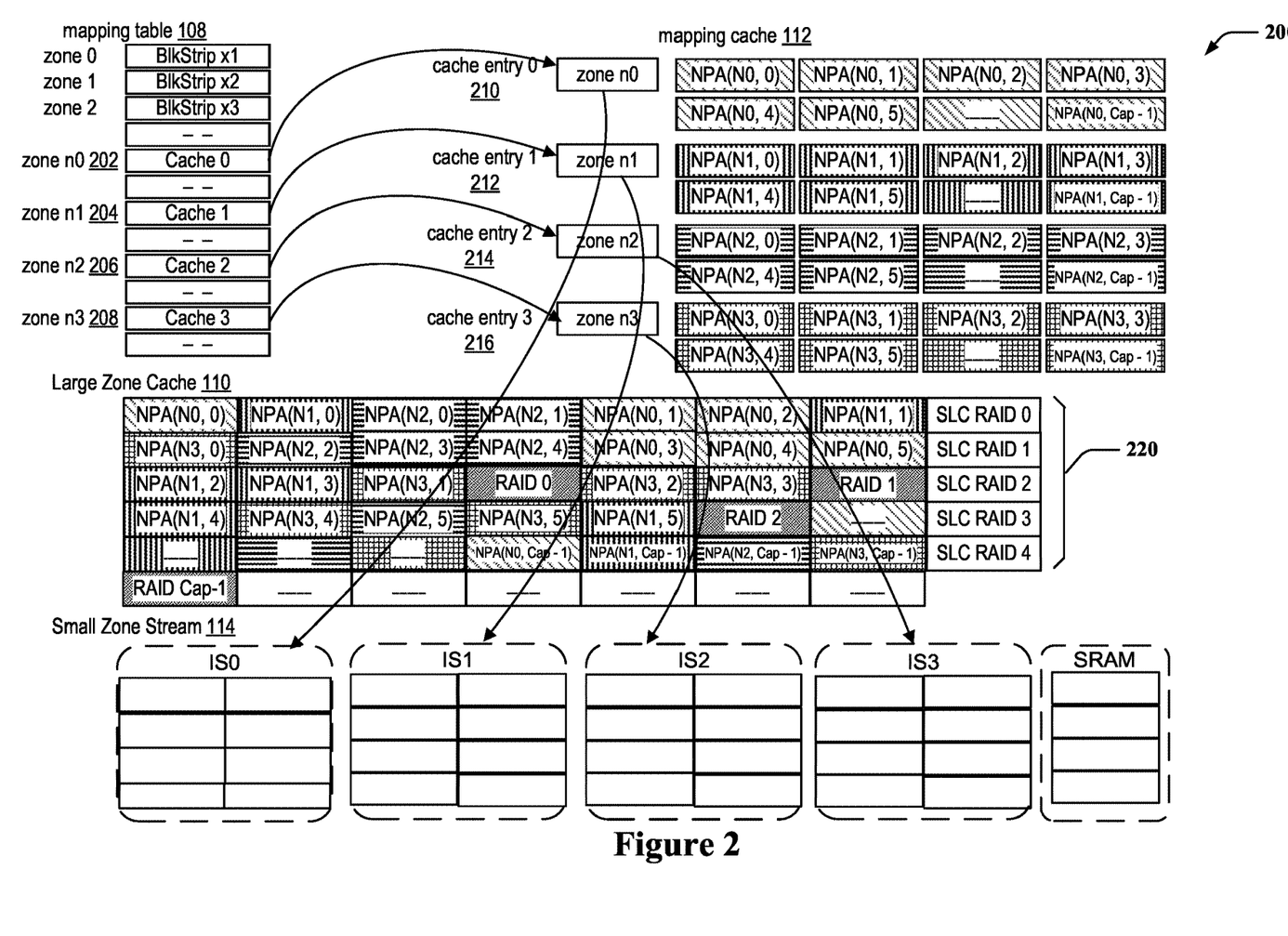
FIG. 2 illustrates an example of storage structures used by a zone storage component, in accordance with aspects described herein.

FIG. 2 illustrates an example of storage structures 200 used by a zone storage component 106, in accordance with aspects described herein. Storage structures 200 include representations of a mapping table 108, large zone cache 110, mapping cache 112, small zone stream 114, as described above and further herein. For example, multiple applications (e.g., applications 126) can write via the drive interface 100 for storing data chunks in one or more storage devices 122. Drive interface 100 can allocate storage locations for the applications 126 that are defined in mapping table 108. For example, mapping table 108 can map to NAND blocks or NAND block strips in a storage device 122, to isolation blocks corresponding to data chunks in small zone stream 114, which can be stored on the storage device 122, or to entries in the mapping cache 112 that correspond to logical blocks of a data chunk in the large zone cache 110. The mapping table 108 can accordingly maintain a list of NPAs associated with data, whether data chunks in isolation blocks or logical blocks of data on the storage device 122. In an example, the table entries in the mapping table 108 can be provided back to the applications 126, and each table entry can point to a NPA, which may include a physical LBA of a storage device 122, a location of an isolation block in the small zone stream 114, a cache entry that points to large zone cache 110 locations, etc.

In an example, large zone cache 110 can include LBs (e.g., NAND blocks) storing data received from the applications 126 for storage, where the LBs can include LBs to be associated as data chunks and as certain table entries in the mapping table 108. Large zone cache 110, however, may be append-only write and random read storage, such that the LBs may not be received or stored sequentially in the large zone cache 110. For example, multiple applications 126 can concurrently write to the drive interface 100, and as such, large zone cache 110 can include scattered LBs from the multiple applications. When LBs are written to the large zone cache 110, zone storage component 106 can write a cache element of an associated cache entry to point to the large zone cache 110 location of the LB, and can store, as the table entry in the mapping table 108 for the corresponding data chunk, an address or identifier of the cache entry in the mapping cache 112.

For example, the zone storage component 106 can allocate zone locations for storing data chunks to one or more applications 126 in zone n0 202, zone n1 204, zone n2 206, and zone n3 208. Based on allocating the zone locations or otherwise on receiving LBs for the allocated zones, zone storage component 106 can update the corresponding mapping table entries to point to cache entries in mapping cache 112. For example, n0 202 can point to cache entry 0 210, zone n1 204 can point to cache entry 1 212, zone n2 206 can point to cache entry 2 214, and zone n3 208 can point to cache entry 3 216. As LBs are stored in large zone cache 110, as received from the applications 126, the associated cache entries can be updated to have cache elements that point to the LBs in the large zone cache 110. For example, when NPA (N0, 0) is stored in the large zone cache 110, zone storage component 106 can update cache entry 0 210 to include a cache element that points to NPA (N0, 0) in the large zone cache 110. Similarly, when NPA (N1, 0) is stored in the large zone cache 110, zone storage component 106 can update cache entry 1 212 to include a cache element that points to NPA (N1, 0) in the large zone cache 110, and so on.

In this example, if an application 126 requests to read, update, delete, etc. LBs associated with the data segment of zone n0 202 before the data is moved to an isolation block in small zone stream 114, zone storage component 106 can obtain the cache entry pointer from the zone n0 202, determine which cache element in the cache entry 0 210 is associated with the requested LB, and determine to which LB in the large zone cache 110 the cache element points. For example, for the LB of NPA (N0, 2) in the data segment of cache entry 0 210, zone storage component 106 can obtain an indication of the LB location in the large zone cache 110 from the cache element in the cache entry 0 210 for NPA (N0, 2), and can obtain the LB for providing to the application 126. In addition, redundancy protection LBs 220 are provided in the large zone cache 110. For example, each stripe in the cache (e.g., each row) can have an associated redundant protection LB (e.g., SLC RAID logical unit number (LUN)). In an example, zone storage component 106 can generate the redundant protection LB based on performing an XOR operation over the LBs in the associated stripe.

In one example, a storage policy can be triggered, which can result in large zone cache 110 LBs being written to a small zone stream 114 for storage. For example, the small zone stream 114 can include multiple isolation blocks IS0, IS1, IS2, IS3, each of which can store a number of LBs, such as a number of LBs corresponding to a data chunk. In this regard, for example, each isolation block can be a size of the data chunk, and can store all LBs of a data chunk. In addition, for example, each cache entry in the mapping cache 112 that is being used to point to LBs for a certain zone can also point to an isolation block corresponding to that zone. For example, cache entry 0 210 can point to isolation block IS0, cache entry 1 212 can point to isolation block IS1, cache entry 2 214 can point to isolation block IS3, and cache entry 3 216 can point to isolation block IS2. An example is shown in FIG. 3.

Figure 3:
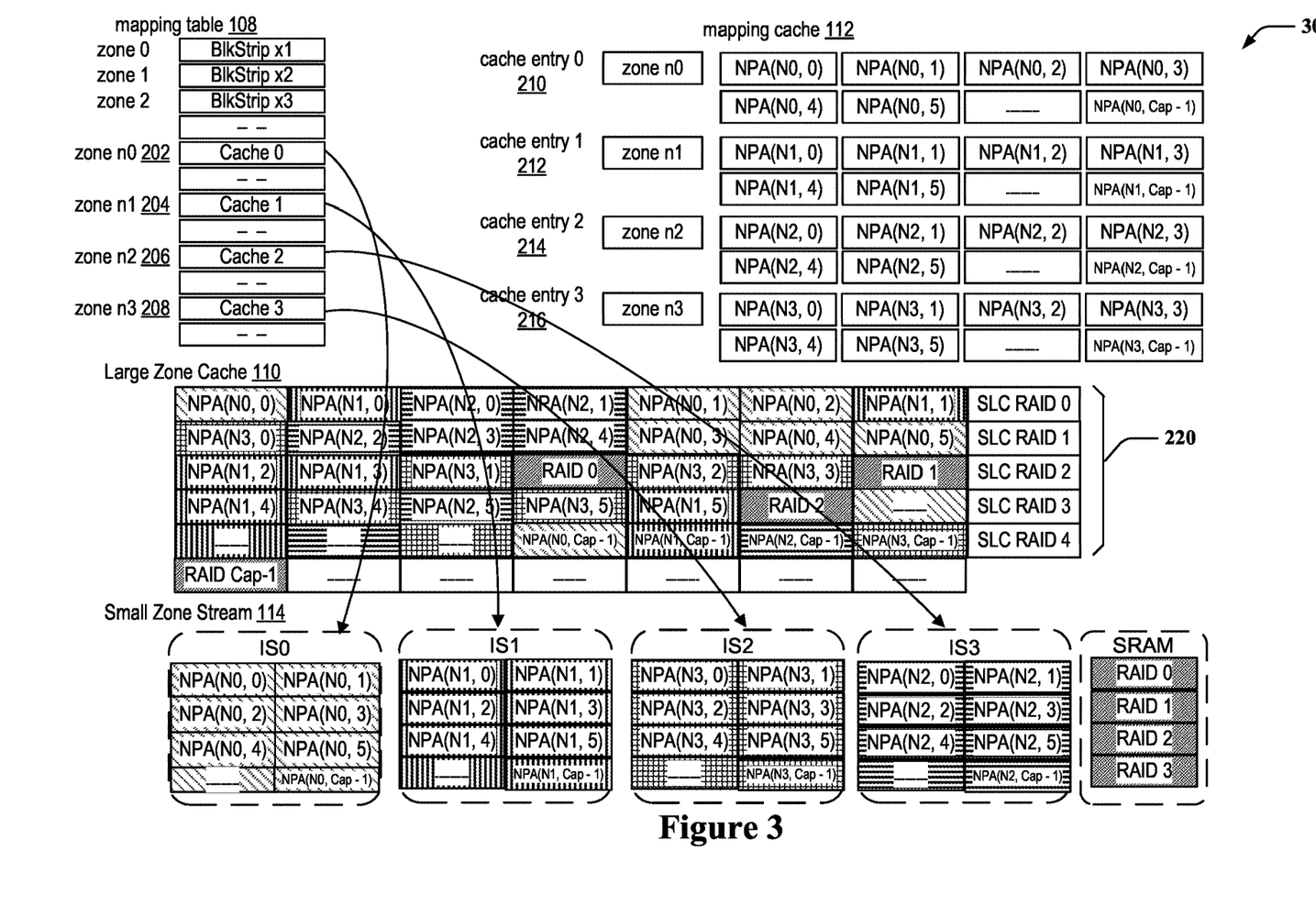
FIG. 3 illustrates an example of storage structures used by a zone storage component in storing logical blocks (LBs) of a data chunk, in accordance with aspects described herein.

FIG. 3 illustrates an example of storage structures 300 used by a zone storage component 106 in storing LBs of a data chunk, in accordance with aspects described herein. Storage structures 300 include representations of a mapping table 108, large zone cache 110, mapping cache 112, small zone stream 114, as described above and further herein. In an example, storage structures 300 can be similar to storage structures 200 described in FIG. 2 above, and can include similar data as storage structures 200 until a storage policy for one or more isolation blocks is triggered. For example, the storage policy can be triggered when all LBs for the isolation block (or associated data chunk) are received in large zone cache 110 or based on other triggers, such as a request to store the data chunk, or all LBs currently in the large zone cache 110 for the data chunk, or to otherwise flush the large zone cache 110 and/or mapping cache 112, etc.

Based on the storage policy for at least zone n0 202, zone n1 204, zone n2 206, and zone n3 208, being triggered, in an example, zone storage component 106 can read cache entry 0 210, cache entry 1 212, cache entry 2 214, and cache entry 3 216, based on the pointer to the cache entries for the zones in mapping table 108. For example, for a given zone or cache entry, such as zone n0 202 or corresponding cache entry 0 210, zone storage component 106 can obtain the cache elements of cache entry 0 210, each of which point to a LB location in large zone cache 110 that includes an LB for the zone (e.g., LB locations in large zone cache 110 of NPA (X0, 0), NPA (X0, 1), NPA (X0, 2) . . . , NPA (X0, Cap−1), shown in large zone cache 110, where Cap can be the capacity of a number of LBs for a given zone or data chunk). In an example, zone storage component 106 can move, copy, or flush these LBs from the large zone cache 110 sequentially into LBs of an associated isolation block in the small zone stream 114. For example, as described, cache entry 0 210 for zone n0 202 can point to isolation block 0 (IS0), and as such, zone storage component 106 can move, copy, or flush the LBs for zone n0 202 to IS0 in the small zone stream 114. For example, this can include writing contents of the LBs (e.g., copying or moving) from the LBs of the large zone cache 110 to the LBs in IS0 and/or deleting the contents of the LBs in the large zone cache 110 that were copied or moved. In addition, zone storage component 106 can update the zone pointer in the mapping table 108 to point to the isolation block (e.g., zone n0 202 can be updated to point to IS0). Zone storage component 106 can perform this operation for multiple zones (e.g., all zones having an associated mapping cache 112 entry, zones having the storage policy triggered, etc.).

In an example, zone storage component 106 can store the LBs sequentially in the isolation blocks to facilitate efficient access of data chunks based on the location of the isolation block, which can be managed for the data chunk by the drive interface 100, as described herein. In addition, when writing the LBs to the small zone stream 114, zone storage component 106 can write metadata for the data chunk, which can include one or more of a zone index pointing to the zone in the mapping table 108, a hotness flag indicating whether the data stored in the data segment is hot, warm, cold, etc., which can be an indication of whether the data is relatively static or dynamic, a quality-of-service (QoS) flag indicating a QoS associated with the data stored in the data segment, etc. In addition, for example, once the LBs are flushed to the small zone stream 114, zone storage component 106 can delete or free data from the mapping cache 112 (e.g., the pointers for the cache elements can be set to NULL), so the cache entries 210, 212, 214, 216 can be reused for managing a subsequent data segment stored in large zone cache 110.

In accordance with aspects described herein, the drive interface 100 can provide a ZNS SSD flash translation layer (FTL) solution, which can provide a small zone size that can align with an append-only write chunk size of a cloud chunk servers or associated application 126, so that WA is minimized as the data chunk can be the basic append and delete granularity. In an example, the FTL solution can provided on, and/or the drive interface 100 can include, an interface card that facilitates accessing a zoned namespace storage device (e.g., SSD). When a data chunk is deleted, as the zone size can be the same as the data chunk size, the whole zone can be a garbage zone so that no garbage collection is needed. Decoupling zone size with write throughput, no matter what the zone size is, may not impact maximum write throughput. QLC NAND can be supported by using SLC cache such to minimize the media quality impaction and provide maximum burst write throughput. In addition, the drive interface 100 can support on-Disk die based RAID protection such to provide higher SLA and smaller explosion radius. Moreover, the drive interface 100 can provide endurance/cost balancing—e.g., limited endurance cost after implementing the solution.

As described, for example, in cloud storage, data can be managed as a data chunk having a fixed size and written into SSD in an append-only way. In a chunk server or associated application 126, there may be multiple open chunks concurrently writing to the SSD (or to a drive interface 100 that facilitates storing data on the SSD). An application 126 can append data onto those open chunks in parallel. To optimize WA, the storage engine (e.g., drive interface 100) can isolate data chunks with different tenure, which can include aligning data chunk size with zone size so that there is no (or minimal) WA in storage engine as all data in a data chunk can have same tenure. Also, as there can be several open data chunks appended in parallel, the open zone resource can be equal or larger than open data chunk count so that storage engine can isolate data chunks. For example, open chunk count can be 256, 1024, etc.

In examples described herein, a ZNS FTL can have small zone capacity with on-disk RAID protection, an open zone count (e.g., 1024), support for QLC, etc., where zone capacity and isolation group may not impact live write performance, zone sequential write performance may saturate bus bandwidth, and/or can use or require a small capacitor—e.g., the capacitor may not need to be large, which can save cost and RMA due to potential capacitor failure.

As described above and further herein, for a data chunk write process, a storage engine (e.g., drive interface 100 or associated zone storage component 106) can allocate open zone for each open data chunk and maintain the chunk ID to Zone ID mapping. For example, zone storage component 106 can allocate the open zone by associating a zone ID in the mapping table 108 (e.g., zone n0 202) with a cache entry in the mapping cache 112 (e.g., cache entry 0 210), and can maintain the chunk ID (e.g., an ID of an isolation block, such as IS0) to zone ID mapping. Zone storage component 106 can write all data (e.g., LBs) for an open data chunks as mixed altogether and written into SLC cache (e.g., into large zone cache 110). Zone storage component 106 can populate a pointer for the zone in the mapping table 108 to point to a cache entry in the mapping cache, as described. Zone storage component 106 can maintain, for each open zone in the mapping cache 112, offset to physical location mapping. After an open chunk is sealed, a relocation engine (e.g., part of zone storage component 106) can use the mapping cache 112 to determine physical location of all the data (e.g., LBs) for the data chunk in the open zone in SLC cache (e.g., large zone cache 110) and move the data for the data chunk into one QLC zone (e.g., isolation block in the small zone stream 114) and finish the zone. After relocation is complete, for example, zone storage component 106 can update the zone ID in mapping table 108 to point to the final QLC location of the zone (e.g., to the isolation block in small zone stream 114).

For example, for a data chunk read process, after receiving a chunk read request, storage engine (e.g., drive interface 100 or associated zone storage component 106) can look up the requested zone ID in the mapping table 108, and determine the chunk ID (e.g., the isolation block identifier) pointed to for the Zone ID in the mapping table 108 to find the related zone and also the physical offset in zone. When the host (e.g., application 126) reads the zone, by using zone ID, FTL (e.g., zone storage component 106) can first access mapping table 108, and if the mapping table 108 entry for the zone points to the mapping cache 112, the zone is still in SLC cache (e.g., in large zone cache 110). By indexing the mapping cache 112, FTL (e.g., zone storage component 106) can find the zone physical offset inside the mapping cache 112 and read data out from SLC cache (e.g., large zone cache 110). If the mapping table 108 entry for the zone points to a QLC block, the zone is finished, and all data of the zone is sequentially stored in the QLC block. FTL (e.g., zone storage component 106) can find the data location in the small zone stream 114 by calculating the data physical location based on the zone physical offset and zone page size.

For example, for a data chunk delete process, if the data chunk is not sealed or it is sealed while it is not relocated to QLC zone, FTL (e.g., zone storage component 106) can update the valid data count of the SLC cache block (e.g., metadata associated with the cache entry in the mapping cache 112 for the data chunk), and the cache entry can be removed and put into free cache entry list. FTL (e.g., zone storage component 106) can do garbage collection for SLC cache blocks to reclaim deleted chunk data.

For example, the mapping table 108 can be a zone to isolation-super-block (IS SB) mapping table, having Zone ID as the table index, and the entry of the Zone mapping table can point to either entry in the mapping cache 112 or an ISSB ID. In the mapping table 108, each entry can include a zone state (e.g., Reset, Open, or Finish state) for the zone, and then the zone mapping table entry can vary based on the state. For example, for Open state, the mapping table entry can include an index in the mapping cache 112 for the zone. For Finish state, the mapping table entry can include the ISSB ID. For Reset state, the mapping table entry can include the ISSB ID while as the Zone does not contain valid data, it can be erased when the open zone pool requires new ISSB.

For the mapping cache 112, each entry can include NPA array pointer, the array including all NPAs for the Zone offset in SLC cache pool or buffer ID in RAM. Mapping cache 112 can also include, for each entry, Zone ID (e.g., the associated Zone ID of the cache entry), ISSB ID (e.g., the allocated ISSB ID for this Zone ID), a Zone Capacity (e.g., the capacity of this Zone which is determined by ISSB), a Write pointer (e.g., the next writable offset, which can support last LBA overwrite, and as such write pointer—1 can be written), Zone State (e.g., Open or Finish), Bad block bitmap for defect block skipping, Next Pointer (e.g., pointer to manage the cache entries for cache policy implementation).

In an example, zone storage component 106 can store zone metadata, which can be stored together with Zone data onto NAND. The zone metadata can include Zone ID (e.g., for sanity check and recovery), QoS Flag (e.g., QoS flag which can be used by the storage policy for selecting a isolation block for a data chunk or other storage parameters), Hotness flag (e.g., application assigned hotness flag which can be used by storage policy for selecting a isolation block for a data chunk or other storage parameters), etc.

FIG. 4 illustrates an example of a state machine 400 for a mapping table 108 entry in accordance with aspects described herein. State machine 400 includes a reset state 402, an open state 404, a close state 406, and a finish state 408, corresponding to a mapping table entry.

For example, each entry can start in the reset state 402, where the zone may not be allocated locations in the mapping cache 112, large zone cache 110, or small zone stream 114. After getting Zone open command, Zone state can switch from Reset state 402 to Open state 404. Storage engine may not support implicitly open, and may send Open Zone command to explicitly open a zone. After getting this command, according to the hotness flag, storage engine can choose a certain ISSB (e.g., isolation block, such as IS0, IS1, IS2, IS3, etc., in FIGS. 2 and 3) based on the hotness flag (e.g., a recent ISSB for hot data or older ISSB for cold data) and can erase the data in the ISSB. Zone storage component 106 can start an Erase retention timer to track the open zone for retention monitor purpose. In addition, based on transitioning to the Open state 404, zone storage component 106 can allocate a cache entry in the mapping cache 112 for the zone—the allocated cache index of the cache entry can be stored in the mapping table 108 and indexed by the open zone ID. In addition, an allocated ISSB ID can be recorded which is associated with this Zone ID. Zone capacity can be updated based on the available space of the associated ISSB, and write pointer can be initialized to 0. Zone State can be set to Open state 404. Erase fail may occur, so the stored zone information can be used after sending open zone command to get the capacity of the zone.

The zone state may transition from Open state 404 to Close state 406 when all data for the data chunk is written to the large zone cache. The zone state may transition from Close state 406 to Finish state 408 (or directly from Open state 404 to Finish state 408) where the Zone can be sequentially written, as described above, and the write pointer can be accordingly updated. For overlap tail write supporting, write pointer—1 can be cached in static random access memory (SRAM) before getting Finish zone command. Finish Zone command can be sent to make zone state transition from Open state 404 to Finish state 408. After getting Finish Zone command, zone state can be transitioned to Finish state 408. A storage policy task (e.g., garbage collection (GC)) can be involved in moving all data from a zone from SLC open zone cache (e.g., large zone cache 110)

to associated ISSB (e.g., in small zone stream 114). If the zone is not fully written, storage engine may pad the ISSB to full to avoid potential open word-line retention problem. After GC finishes, Zone mapping table entry indexed by Zone ID can be updated to the ISSB ID, and open zone cache entry in the mapping cache 112 can be released. Background scan task can cover all Finish Zone.

After chunk gets deleted, storage engine may reclaim the zone by sending Zone Reset command to transfer zone state from Finish state 408 to Reset state 402. After getting Reset Zone command, the zone state can be transitioned to Reset State 402. Background scan task may not cover Reset state zone. Mapping table entry indexed by Zone ID can be updated to trim state. Associated ISSB can be decoupled from Zone ID and pushed to garbage ISSB state queue as future erase candidate.

FIG. 5 illustrates an example of a state machine 500 for a mapping cache 112 cache entry in accordance with aspects described herein. State machine 500 includes an idle state 502, a RAM state 504, and a large zone cache state 506. The cache entry can start from IDLE state 502, where LBs of a data chunk can be first placed in RAM with associated buffer slot ID. After allocating zone identifier to a data chunk by drive interface 100 (or corresponding FW) or other process, the cache entry in the mapping cache 112 can be associated with a data chunk or corresponding isolation block (e.g., associated with a table entry in the mapping table 108).

The open zone can be cached in the RAM state 504. In the RAM state 504, the LB's buffer slot ID can be placed into a cache element of the cache entry in the mapping cache 112 (e.g., into LB mapping info cache entry of the data chunk). In this state, data of LBs of the data chunk can be in RAM. When RAM cache is full, if data chunk is fully written, drive interface 100 (or corresponding FW) can GC the data chunk to its associated isolation block in the small zone stream 114, and the cache entry (or corresponding cache elements in the cache entry) can be released. If the data segment is not fully written, drive interface 100 (or corresponding FW) can write the LBs it has for the data chunk into the isolation block.

In the large zone cache state 506, LBs can be cached in large zone cache 110. When the large zone cache 110 is full or the cache entry for the data chunk (e.g., LB mapping info cache) is full, drive interface 100 (or corresponding FW) can GC the data segment from large zone cache 110 to its isolation block in the small zone stream 114 so that cache entry can switch to IDLE state 502 and release the cache entry information and/or corresponding cache elements.

FIG. 6 is a flowchart of an example of a method 600 for writing data chunks in zone storage. For example, method 600 can be performed by a drive interface 100 and/or one or more components thereof for storing data chunks in one or more storage devices 122.

In method 600, at action 602, one or more LBs corresponding to a data chunk can be stored in a first zone cache. In an example, zone storage component 106, e.g., in conjunction with processor 102, memory 104, etc., can store, in the first zone cache (e.g. large zone cache) 110, the one or more LBs correspond to the data chunk. For example, one or more applications 126, which may be executing on a same or different computing device as the drive interface 100, may request storage of data via the drive interface 100. In this example, zone storage component 106 can determine to store the data in data chunks or associated isolation blocks, which can be larger in size than LBs of the storage device(s) 122 (and can comprise multiple LBs, as described herein). In one example, based on receiving a request for storage, drive interface 100 can provide the application(s) 126 with a corresponding zone identifier used for, or otherwise associated with, storing the data chunk. As described, the zone identifier can correspond to, or can be resolved to, an index of an entry in the mapping table 108.

In method 600, at action 604, a cache element of a cache entry that points to the LB in the first zone cache can be written for each LB in the data chunk. In an example, zone storage component 106, e.g., in conjunction with processor 102, memory 104, etc., can write, for each LB in the data chunk, the cache element of the cache entry that points to the LB in the first zone cache (e.g., large zone cache 110). For example, when zone storage component 106 stores an LB in the large zone cache 110, it can determine to which data chunk or zone the LB belongs, which may be identified by a process requesting storage of the LB, an identifier in the zone or LB, etc. In an example, zone storage component 106 can obtain the cache entry pointer for the zone from the mapping table 108 entry, and can populate a cache element corresponding to the LB with an index into the large zone cache 110 for the LB. For example, referring to FIG. 2, when LB for NPA (N1, 1) is stored in large zone cache 110, zone storage component 106 can update the second cache element of cache entry 1 210 with the location in large zone cache 110 of the LB for NPA (N1, 1).

In method 600, at action 606, a table entry in a mapping table that points to the cache entry can be written for the cache entry. In an example, zone storage component 106, e.g., in conjunction with processor 102, memory 104, etc., can write, for the cache entry, the table entry in the mapping table that points to the cache entry. For example, zone storage component 106 can write the table entry to point to the cache entry for all cache entries in the mapping cache 112 that have cache elements pointing to LBs in the large zone cache 110. In one example, zone storage component 106 can write the table entries as pointers into the mapping cache 112 based on providing a table entry identifier (e.g., zone identifier) to an application 126 for a data chunk to be stored, or based on receiving a first LB for the data chunk in the large zone cache 110, etc. For example, referring to FIG. 2, zone storage component 106 can write the table entry 1 204 to point to cache entry 1 210 in the mapping cache 112. This process can continue for multiple LBs received in the large zone cache 110.

At some point in time, at action 608, a storage policy trigger can be detected. In an example, zone storage component 106, e.g., in conjunction with processor 102, memory 104, etc., can detect the storage policy trigger. For example, the storage policy trigger may correspond to a specific data chunk, or to the large zone cache 110 in general, as described. In one example, the storage policy can related to, or be triggered by, filling all LBs allocated (or indicated a cache elements in the cache entry) for a data chunk or corresponding zone. In any case, based on detecting the storage policy trigger at action 608, at action 610, multiple LBs, pointed to be each cache element of the cache entry, can be written as contiguous LBs in an isolation block for the data chunk in a second zone stream. In an example, zone storage component 106, e.g., in conjunction with processor 102, memory 104, etc., can write the multiple LBs, pointed to by each cache element of the cache entry, for storing as contiguous LBs in an isolation block for the data chunk in the second zone stream (e.g., small zone stream 114). For example, at least a portion of the multiple LBs associated with a cache entry may be in non-contiguous locations in the large zone cache 110, and zone storage component 106 can write the multiple logical blocks, associated with the cache entry, from the large zone cache 110 in a sequence corresponding to the order of the multiple cache elements as specified in the corresponding cache entry, as shown and described in reference to FIG. 3. Zone storage component 106 can write the multiple LBs for storing in the small zone stream 114, which may be on storage device 122 or may otherwise result in storing the LBs on the storage device 122.

Based on storage in the small zone stream 114 as isolation blocks, for example, the data chunks can be accessed by storing a NPA of the isolation block. Accordingly, at action 612, the table entry can be updated to point to the isolation block in the second zone stream. In an example, zone storage component 106, e.g., in conjunction with processor 102, memory 104, etc., can update the table entry (e.g., in the mapping table 108) of the data segment to point to the isolation block in the second zone stream (e.g., small zone stream 114, which may be on the storage device 122), instead of to the cache entry.

In method 600, optionally at action 614, the isolation block can be selected based on zone metadata. In an example, zone storage component 106, e.g., in conjunction with processor 102, memory 104, etc., can select, for the data chunk, the isolation block based on zone metadata. For example, for the data chunk or associated zone, metadata can be stored to indicate a hotness flag, QoS flag, etc. for the data chunk or zone. In an example, zone storage component 106 can select an isolation block in the small zone stream 114 based on the hotness flag or QoS flag. For example, zone storage component 106 may select a recent isolation block for hot data, or an older isolation block for cold data, as the hotness flag may indicate whether the data is relatively dynamic or static.

In method 600, optionally at action 616, zone metadata can be updated based on storing the contiguous LBs. In an example, zone storage component 106, e.g., in conjunction with processor 102, memory 104, etc., can update zone metadata for the data chunk or zone based on storing the contiguous LBs. For example, as described, zone storage component 106 can update a write pointer, zone capacity, hotness flag or QoS flag based on application-specified parameters for the data stored in the data segment, etc. Zone storage component 106 can update metadata for the data segment at other points in the process as well.

For example, in writing the cache element at action 604, optionally at action 618, zone metadata can be updated based on writing the cache element. In an example, zone storage component 106, e.g., in conjunction with processor 102, memory 104, etc., can update zone metadata for the data chunk or zone based on writing the cache element. For example, as described, zone storage component 106 can update a write pointer, zone capacity, hotness flag or QoS flag based on application-specified parameters for the data stored in the data segment, etc.

In one example, as described, redundancy protection can be provided for each stripe in the large zone cache as LBs are written to the large zone cache (e.g., redundancy protection LBs 220 in FIGS. 2 and 3). In addition, redundancy protection can be provided for stripes in the small zone stream 114 for multiple isolation blocks. For example, in method 600, optionally at action 620, a redundancy value for a stripe of LBs corresponding to each of multiple isolation blocks can be updated based on writing the multiple LBs. In an example, redundancy component 116, e.g., in conjunction with processor 102, memory 104, etc., can update, based on writing the multiple LBs, the redundancy value for the stripe of LBs corresponding to each of multiple isolation blocks. For example, referring to FIG. 3, redundancy protection LB RAID 0 can be provided for a corresponding stripe of isolation block LBs (e.g., NPA (N0, 0), NPA (N0, 1), NPA (N1, 0), NPA (N1, 1), NPA (N3, 0), NPA (N3, 1), NPA (N2, 0), NPA (N2, 1)), and can be updated as the data in the corresponding LBs is populated, updated, deleted, etc.

For example, in method 600, optionally at action 622, the redundancy value can be flushed to the first zone cache for storage or written to a power loss log. In an example, redundancy component 116, e.g., in conjunction with processor 102, memory 104, etc., can (e.g., after updating the redundancy value) flush the redundancy value to the first zone cache (e.g., large zone cache 110) for storage or write the redundancy value to a power loss log. For example, referring to FIG. 3, redundancy component 116 can flush RAID 0 into large zone cache 110 for storage (e.g., instead of allocating a RAID LUN in the small zone stream 114). For example, for small zone ZNS RAID protection, the total RAID pages size may be of limited space (e.g., 1:128 ratio or below may be preferred). In addition, as described, having the RAID protection for the small zone stream can facilitate all data on the SSD having RAID protection no matter the data is in SLC cache or QLC. In an example, RAID page swap can be used as RAID page cache is limited. Some ASIC platforms can have dynamic random access memory (DRAM) bandwidth limitation. For QLC, the system throughput may be ok as the QLC NAND is low; for TLC solution, DRAM may be a bottleneck. In-ASIC data path optimization can be used to minimize DRAM access including: low-density parity-check (LDPC) encoder (ENC)/decoder (DEC) engine on the fly design, reliable array of independent nodes (RAIN) accumulation on the fly design.

In an example, static raid stripe may include grouping RAID stripe based on Super-Block. Using dynamic Zone to ISSB mapping, storage engine may not know the ISSB so that it may not specify zones across different isolation groups in the same RAID stripe. To optimize the RAID stripe grouping, dynamic RAID strip grouping can be used as described above, where zones from different isolation groups can be grouped together to generate RAID no matter which super-block those zones are located. By using dynamic RAID grouping, if storage engine allocates Zones across isolation groups, redundancy component 116 can generate RAID stripes for those zones. ISSB to RAID stripe ID mapping can be managed as it is dynamically generated.

In an example, where redundancy component 116 writes the redundancy value to a power loss log, this can assist in recovering from power loss at one or more of the large zone cache 110 and/or small zone stream 114. For example, as all data coming into the drive interface 100 can first go into SLC and then GC to QLC, when power loss happens the data can be protected including all caching large zone data in SRAM, all dirty RAID pages in SRAM/DRAM, and critical metadata. In an example, the power loss data can be organized as a power loss log and flushed into SLC zone (e.g., large zone cache 110) when power loss is detected. Comparing to directly writing into QLC open zones, which may use many capacitors to hold up the QLC program, SLC can be faster than QLC, so that fewer capacitors can be used, and it can be safer to put data into SLC first as QLC may not be stable when the zone is in open state. If QLC open word-line does not have retention issues, as QLC can be 2-pass program except FG NAND, FW can cache all page groups for the second pass, which can be 16 pages. With the same Zone size, which can be 4 erase block (EB), each EB page size can be 32 KB. For one page stripe, the size of page stripe can be 4 DIE×32K=128 KB, each zone can cache 16 page strips so that the number can be 128 KB×16=2 MB. For 1024 open zone, 2 GB data can be cached in DRAM. When power loss happens, it may be difficult to flush 2 GB data into DRAM.

FIG. 7 is a flowchart of an example of a method 700 for processing data chunks stored in a zone storage. For example, method 700 can be performed by a drive interface 100 and/or one or more components thereof for processing data segments stored in zone storage in a storage device 122.

In method 700, at action 702, a request to process a data chunk can be received. In an example, zone storage component 106, e.g., in conjunction with processor 102, memory 104, etc., can receive a request (e.g., from one or more applications 126) to process a data chunk stored on one or more storage devices 122. For example, the request can indicate the data chunk or zone (e.g., a corresponding zone ID, isolation block, etc.) requested for processing. In an example, zone storage component 106 can determine the zone ID or isolation block associated with the data chunk in the mapping table 108. In addition, the request to process the data chunk may include a request to read the data chunk, update or modify the data chunk, delete the data chunk, etc.

After locating the zone, at action 704, the zone state can be determined. In an example, zone storage component 106, e.g., in conjunction with processor 102, memory 104, etc., can determine the zone state. For example, zone storage component 106 can obtain the metadata for the zone, which can include the zone state, as described above. In another example, zone storage component 106 may discern the zone state based on whether the zone entry in the mapping table 108 points to the mapping cache 112 or the small zone stream 114.

For example, where the zone state is open, optionally at action 706, a cache entry index can be obtained. In an example, for zones in the open state, zone storage component 106, e.g., in conjunction with processor 102, memory 104, etc., can obtain the cache entry index from the table entry for the zone index in the mapping table 108. For example, the zone ID may point to a cache entry for the zone in the mapping cache 112.

In method 700, optionally at action 708, data stored in LBs of first zone cache for associated data chunk can be obtained. In an example, for zones in the open state, zone storage component 106, e.g., in conjunction with processor 102, memory 104, etc., can obtain data stored in LBs of the first zone cache (e.g., large zone cache 110) for the associated data chunk. For example, the cache entry for the data chunk or zone can include multiple cache elements, each pointing to a LB in the large zone cache 110. The LBs can be collected from the large zone cache 110 for further processing. In one example, these actions can also be performed where the zone state is closed and the LBs for the data chunk are still in the large zone cache 110.

For example, where the zone state is final, optionally at action 710, data can be obtained from an isolation block in the second zone stream (e.g., small zone stream 114). In an example, for zones in the final state, zone storage component 106, e.g., in conjunction with processor 102, memory 104, etc., can obtain the data from the isolation block in the small zone stream 114. For example, in the final state, the data for a data chunk can be written to the small zone stream 114, and/or may be removed from the large zone cache 110. In any case, the isolation block can include a full data chunk for more efficient processing.

In method 700, at action 712, the data of the data chunk can be processed. In an example, zone storage component 106, e.g., in conjunction with processor 102, memory 104, etc., can process the data of the data chunk. For example, this can include returning the data of the data chunk for a read request, updating the data of the data chunk for an update request, deleting data of the data chunk for a delete request, etc. Performing the processing per data chunk stored in an isolation block for the one or more applications 126 can be more efficient than processing data scattered in an open zone, as described.

In method 700, optionally at action 714, metadata for the data chunk or redundancy protection can be updated. In an example, zone storage component 106, e.g., in conjunction with processor 102, memory 104, etc., can update metadata for the data chunk or redundancy protection. For example, where the data in the data chunk is modified, zone storage component 106 can update metadata for the zone, such as a write pointer and/or capacity where a portion of the data is deleted. In another example, where the data in the data chunk is modified, zone storage component 106 can update the redundancy protection for the small zone stream 114, such as where data is updated or removed.

Figure 8:
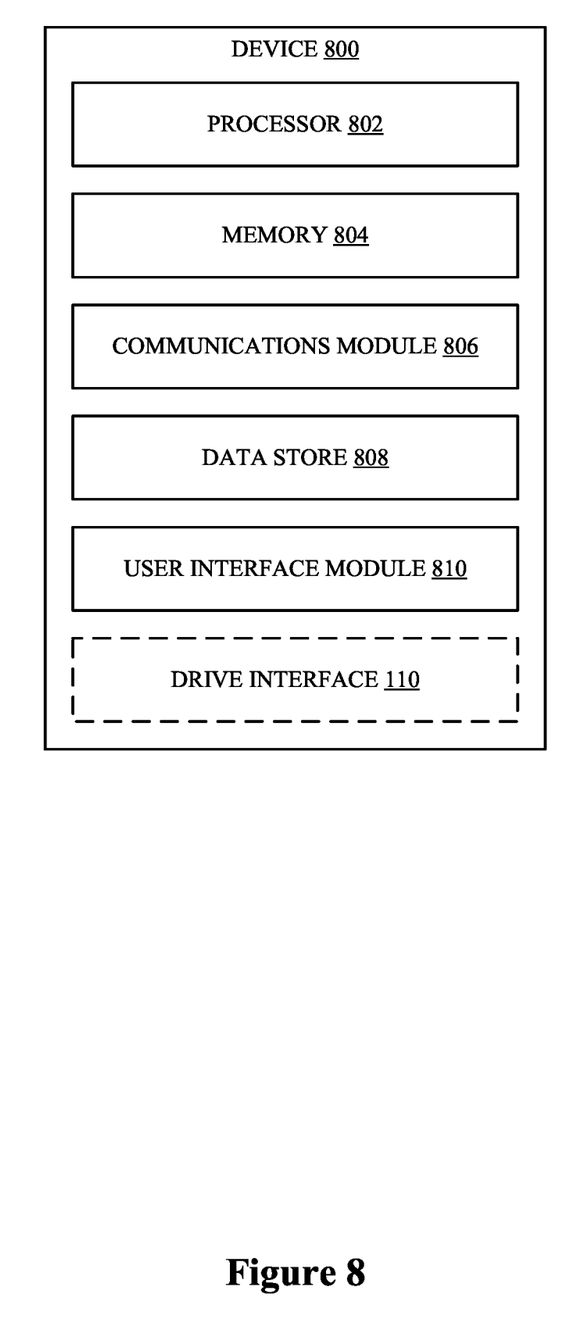
FIG. 8 is a schematic diagram of an example of a device for performing functions described herein.

FIG. 8 illustrates an example of device 800, including additional optional component details as those shown in FIG. 1. In one implementation, device 800 may include processor 802, which may be similar to processor 102 for carrying out processing functions associated with one or more of components and functions described herein. Processor 802 can include a single or multiple set of processors or multi-core processors. Moreover, processor 802 can be implemented as an integrated processing system and/or a distributed processing system.

Device 800 may further include memory 804, which may be similar to memory 104 such as for storing local versions of applications being executed by processor 802, such as drive interface 100, etc. Memory 804 can include a type of memory usable by a computer, such as random access memory (RAM), read only memory (ROM), tapes, magnetic discs, optical discs, volatile memory, non-volatile memory, and any combination thereof.

Further, device 800 may include a communications module 806 that provides for establishing and maintaining communications with one or more other devices, parties, entities, etc., utilizing hardware, software, and services as described herein. Communications module 806 may carry communications between modules on device 800, as well as between device 800 and external devices, such as devices located across a communications network and/or devices serially or locally connected to device 800. For example, communications module 806 may include one or more buses, and may further include transmit chain modules and receive chain modules associated with a wireless or wired transmitter and receiver, respectively, operable for interfacing with external devices.

Additionally, device 800 may include a data store 808, which can be any suitable combination of hardware and/or software, that provides for mass storage of information, databases, and programs employed in connection with implementations described herein. For example, data store 808 may be or may include a data repository for applications and/or related parameters (e.g., drive interface 100, etc.) not currently being executed by processor 802. In addition, data store 808 may be a data repository for drive interface 100, such as one or more storage devices 122, etc., and/or one or more other modules of the device 800.

Device 800 may include a user interface module 810 operable to receive inputs from a user of device 800 and further operable to generate outputs for presentation to the user. User interface module 810 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface module 810 may include one or more output devices, including but not limited to a display, a speaker, a haptic feedback mechanism, a printer, any other mechanism capable of presenting an output to a user, or any combination thereof.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more implementations, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various implementations described herein. Various modifications to these implementations will be readily apparent to those skilled in the art, and the generic principles defined herein may be applied to other implementations. Thus, the claims are not intended to be limited to the implementations shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various implementations described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for zoned namespace (ZNS) storage using multiple zones, comprising:
    storing, in a first zone cache, one or more logical blocks corresponding to a data chunk;
    writing, for each logical block in the data chunk, a cache element of a cache entry that points to the logical block in the first zone cache, wherein the cache entry includes multiple cache elements corresponding to the multiple logical blocks of the data chunk;
    writing, for the cache entry, a table entry in a mapping table that points to the cache entry; and
    when a storage policy is triggered for the cache entry:
        writing the multiple logical blocks, pointed to by each cache element of the cache entry, as contiguous logical blocks in an isolation block for the data chunk in a second zone stream; and
        updating the table entry to point to the isolation block in the second zone stream.

2. The computer-implemented method of claim 1, further comprising updating, based on writing the multiple logical blocks in the isolation block, a redundancy value for a stripe of logical blocks corresponding to each of multiple isolation blocks including a portion of the multiple logical blocks in the isolation block.

3. The computer-implemented method of claim 2, further comprising flushing the redundancy value to the first zone cache for storage.

4. The computer-implemented method of claim 2, further comprising updating, based on storing the one or more logical blocks in the first zone cache, a second redundancy value for a strip of logical blocks in the first zone cache that includes the one or more logical blocks.

5. The computer-implemented method of claim 4, further comprising writing, based on detecting a power loss, one or more redundancy values, including the second redundancy value, to a power loss log.

6. The computer-implemented method of claim 1, further comprising selecting, for the data chunk, the isolation block based on a hotness or quality-of-service (QoS) flag associated with data to be stored in the data chunk.

7. The computer-implemented method of claim 1, wherein the storage policy is triggered by filling each of the multiple logical blocks of a data chunk.

8. The computer-implemented method of claim 1, wherein storing the one or more logical blocks includes concurrently storing, using an append-only write operation, multiple logical blocks corresponding to one of the data chunk or multiple data chunks including the data chunk.

9. The computer-implemented method of claim 1, wherein at least a portion of the multiple logical blocks associated with a cache entry are in non-contiguous locations in the first zone cache, and wherein writing the multiple logical blocks to the second zone stream includes writing the multiple logical blocks, associated with the cache entry, from the first zone cache to the isolation block in a sequence corresponding to an order of the multiple cache elements in the cache entry.

10. The computer-implemented method of claim 1, wherein the first zone cache is provided by an interface card that facilitates accessing a zoned namespace storage device.

11. The computer-implemented method of claim 1, further comprising processing the data chunk based on the table entry, including:

where the table entry points to the cache entry, processing the multiple logical blocks in the first zone cache that are associated with the data chunk; or where the table entry points to the isolation block, processing the isolation block in the second zone stream.

12. An apparatus for zoned namespace (ZNS) storage using multiple zones, the apparatus comprising a processor and a non-transitory memory with instructions thereon, wherein the instructions upon execution by the processor, cause the processor to:

store, in a first zone cache, one or more logical blocks corresponding to a data chunk;

write, for each logical block in the data chunk, a cache element of a cache entry that points to the logical block in the first zone cache, wherein the cache entry includes multiple cache elements corresponding to the multiple logical blocks of the data chunk;

write, for the cache entry, a table entry in a mapping table that points to the cache entry; and when a storage policy is triggered for the cache entry:
write the multiple logical blocks, pointed to by each cache element of the cache entry, as contiguous logical blocks in an isolation block for the data chunk in a second zone stream; and
update the table entry to point to the isolation block in the second zone stream.

13. The apparatus of claim 12, wherein the instructions cause the processor to update, based on writing the multiple logical blocks in the isolation block, a redundancy value for a stripe of logical blocks corresponding to each of multiple isolation blocks including a portion of the multiple logical blocks in the isolation block.

14. The apparatus of claim 13, wherein the instructions cause the processor to flush the redundancy value to the first zone cache for storage.

15. The apparatus of claim 13, wherein the instructions cause the processor to update, based on storing the one or more logical blocks in the first zone cache, a second redundancy value for a strip of logical blocks in the first zone cache that includes the one or more logical blocks.

16. The apparatus of claim 15, wherein the instructions cause the processor to write, based on detecting a power loss, one or more redundancy values, including the second redundancy value, to a power loss log.

17. The apparatus of claim 12, wherein the instructions cause the processor to select, for the data chunk, the isolation block based on a hotness or quality-of-service (QoS) flag associated with data to be stored in the data chunk.

18. The apparatus of claim 12, wherein the storage policy is triggered by filling each of the multiple logical blocks of a data chunk.

19. The apparatus of claim 12, wherein the instructions cause the processor to store the one or more logical blocks at least in part by concurrently storing, using an append-only write operation, multiple logical blocks corresponding to one of the data chunk or multiple data chunks including the data chunk.

20. A non-transitory computer-readable storage medium storing instructions that when executed by a processor cause the processor to execute a method, wherein the method comprises:

storing, in a first zone cache, one or more logical blocks corresponding to a data chunk;

writing, for each logical block in the data chunk, a cache element of a cache entry that points to the logical block in the first zone cache, wherein the cache entry includes multiple cache elements corresponding to the multiple logical blocks of the data chunk;

writing, for the cache entry, a table entry in a mapping table that points to the cache entry; and when a storage policy is triggered for the cache entry:
writing the multiple logical blocks, pointed to by each cache element of the cache entry, as contiguous logical blocks in an isolation block for the data chunk in a second zone stream; and
updating the table entry to point to the isolation block in the second zone stream.

* * * * *